US006875535B2

(12) United States Patent
Ye et al.

(10) Patent No.: US 6,875,535 B2
(45) Date of Patent: Apr. 5, 2005

(54) MANIFOLD FOR A FUEL CELL SYSTEM

(75) Inventors: Jianming Ye, Woodbridge (CA); Ricardo Bazzarella, Cambridge (CA); Joseph Cargnelli, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 140 days.

(21) Appl. No.: 10/122,137

(22) Filed: Apr. 15, 2002

(65) Prior Publication Data

US 2003/0194596 A1 Oct. 16, 2003

(51) Int. Cl.[7] .............................................. H01M 8/04
(52) U.S. Cl. ........................................ 429/39; 429/26
(58) Field of Search ............................. 429/26, 32, 34, 429/38, 39

(56) References Cited

U.S. PATENT DOCUMENTS

| 4,670,361 | A |   | 6/1987  | Tsutsumi et al. |         |
|-----------|---|---|---------|-----------------|---------|
| 4,873,155 | A |   | 10/1989 | Hirota et al.   |         |
| 5,472,800 | A |   | 12/1995 | Goto et al.     |         |
| 6,013,385 | A | * | 1/2000  | DuBose          | 429/26 X |
| 6,110,612 | A | * | 8/2000  | Walsh           | 429/34 X |
| 6,159,629 | A | * | 12/2000 | Gibb et al.     | 429/38 |
| 6,541,148 | B1 | * | 4/2003  | Walsh et al.    | 429/39 |
| 6,613,470 | B1 | * | 9/2003  | Sugita et al.   | 429/38 |
| 6,653,008 | B1 | * | 11/2003 | Hirakata et al. | 429/26 |
| 2001/0049038 | A1 |   | 12/2001 | Kickman et al. |        |
| 2001/0049039 | A1 |   | 12/2001 | Haltiner, Jr.  |        |
| 2002/0078589 | A1 |   | 6/2002  | Bostaph et al. |        |
| 2002/0168560 | A1 | * | 11/2002 | Mukerjee et al. | 429/38 |

FOREIGN PATENT DOCUMENTS

| EP | 1030396 A1    | 8/2000  |
| WO | WO 01/82391 A2 | 11/2001 |
| WO | WO 03/007414 A2 | 1/2003  |

* cited by examiner

Primary Examiner—Stephen J. Kalafut
(74) Attorney, Agent, or Firm—Bereskin & Parr

(57) ABSTRACT

A manifold for a fuel cell system, has a manifold body and a plurality of first ports in the manifold body, for connecting to fuel cell peripherals. A plurality of second ports in the manifold body provide connections to a fuel cell. A plurality of first fluid passages within the manifold provide communication between respective ones of the first ports and respective ones of the second ports, whereby, in use, the fluid passages communicate fluids between the fuel cell stack and fuel cell peripherals. The manifold provides a higher degree of system integration, considerably reduced piping, fittings and associated hardware and hence generally reduces the size and weight of the fuel cell system. Thermal-fluid related system losses are also minimized.

19 Claims, 6 Drawing Sheets

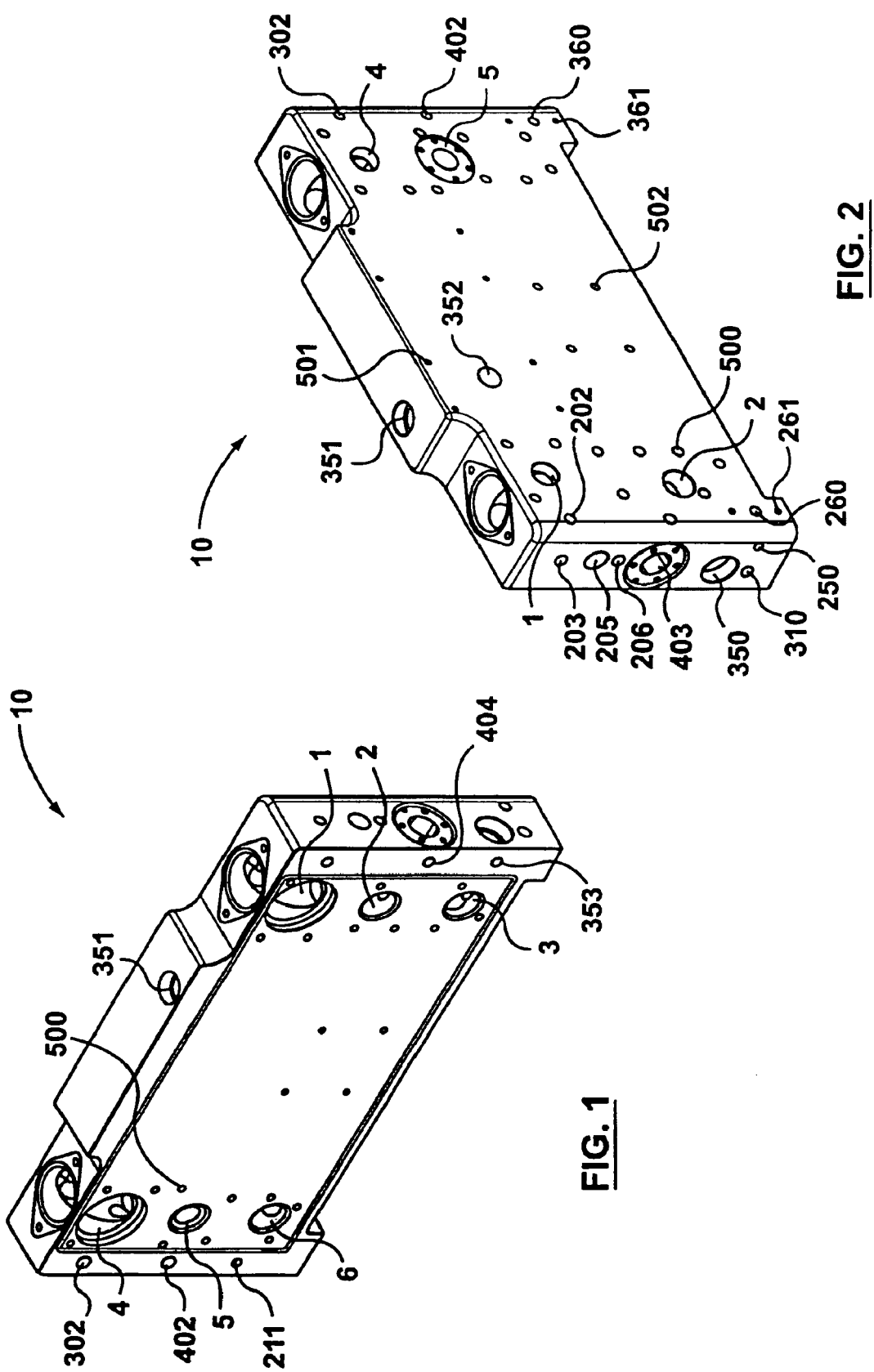

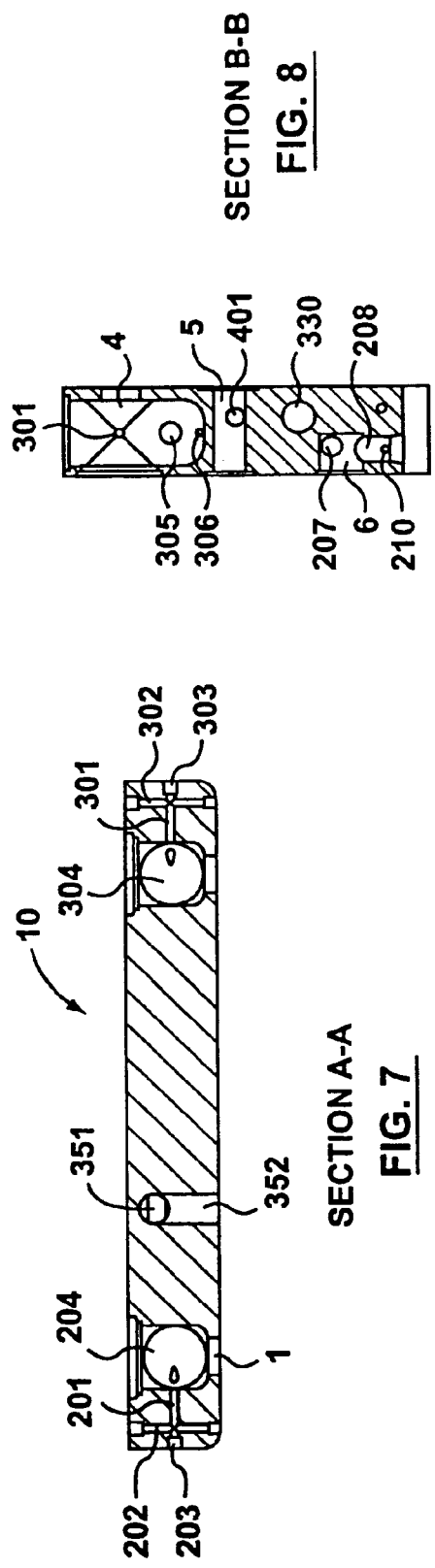
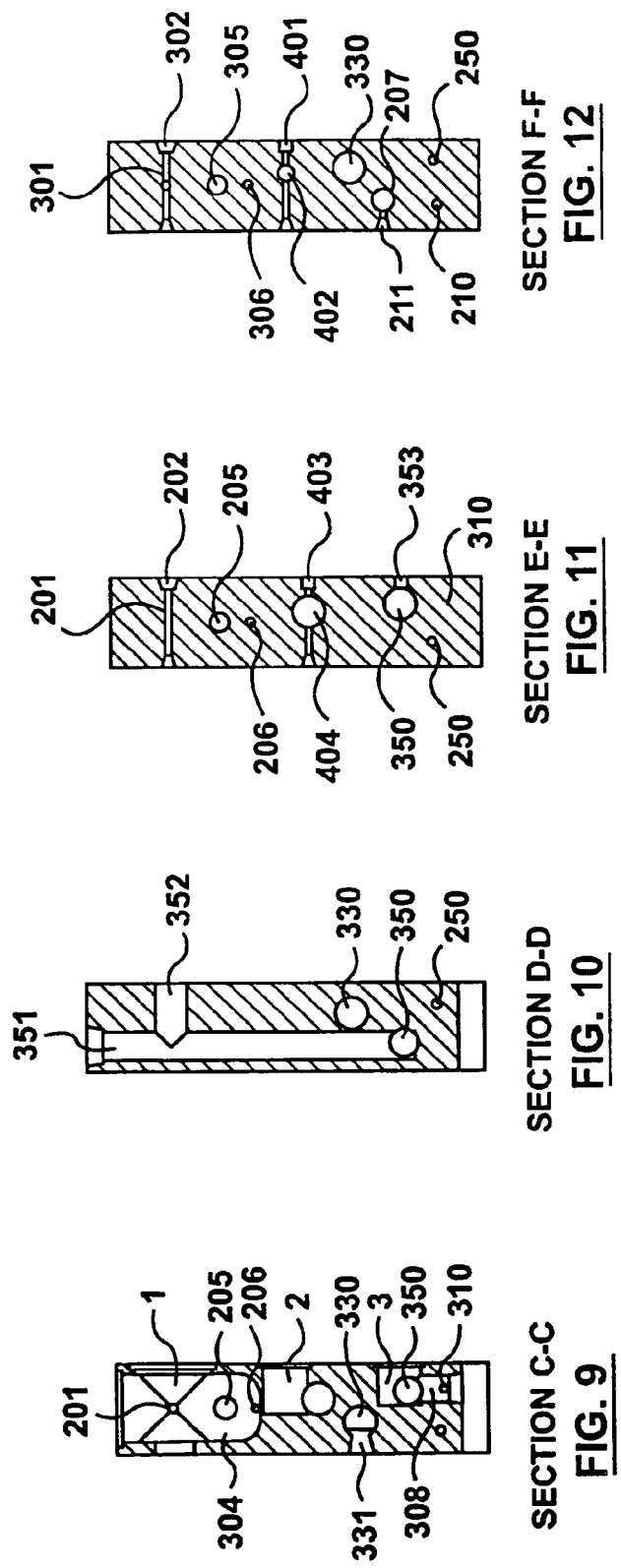

MANIFOLD FOR A FUEL CELL SYSTEM

FIELD OF THE INVENTION

This invention relates to a manifold for a fuel cell system, and more particularly relates to a manifold for mounting peripherals and piping to fuel cell stacks.

BACKGROUND OF THE INVENTION

Fuel cells have been proposed as a clean, efficient and environmentally friendly source of power which can be utilized for various applications. A fuel cell is an electrochemical device that produces an electromotive force by bringing the fuel (typically hydrogen) and an oxidant (typically air) into contact with two suitable electrodes and an electrolyte. A fuel, such as hydrogen gas, for example, is introduced at a first electrode, i.e. anode where it reacts electrochemically in the presence of the electrolyte to produce electrons and cations. The electrons are conducted from the anode to a second electrode, i.e. cathode through an electrical circuit connected between the electrodes. Cations pass through the electrolyte to the cathode. Simultaneously, an oxidant, such as oxygen gas or air is introduced to the cathode where the oxidant reacts electrochemically in presence of the electrolyte and catalyst, producing anions and consuming the electrons circulated through the electrical circuit; the cations are consumed at the second electrode. The anions formed at the second electrode or cathode react with the cations to form a reaction product. The anode may alternatively be referred to as a fuel or oxidizing electrode, and the cathode may alternatively be referred to as an oxidant or reducing electrode. The half-cell reactions at the two electrodes are, respectively, as follows:

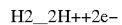

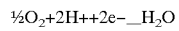

The external electrical circuit withdraws electrical current and thus receives electrical power from the fuel cell. The overall fuel cell reaction produces electrical energy as shown by the sum of the separate half-cell reactions written above. Water and heat are typical by-products of the reaction. Accordingly, the use of fuel cells in power generation offers potential environmental benefits compared with power generation from combustion of fossil fuels or by nuclear activity. Some examples of applications are distributed residential power generation and automotive power systems to reduce emission levels.

In practice, fuel cells are not operated as single units. Rather fuel cells are connected in series, stacked one on top of the other, or placed side-by-side, to form what is usually referred to as a fuel cell stack. The fuel, oxidant and coolant are supplied through respective delivery subsystems to the fuel cell stack. Also within the stack are current collectors, cell-to-cell seals and insulation, with required piping and instrumentation provided externally to the fuel cell stack.

In conventional fuel cell systems, extensive piping and plumbing work is required since in operation fuel cell systems rely on peripheral preconditioning devices for optimum or even proper operation. For example, in the situation where the fuel gas of the fuel cell stack is not pure hydrogen, but rather hydrogen containing material, e.g. natural gas a reformer is usually required in the fuel delivery subsystem for reforming the hydrogen containing material to provide pure hydrogen to the fuel cell stack. Moreover, in the situation where the electrolyte of the fuel cell is a proton exchange membrane, since the membrane requires a wet surface to facilitate the conduction of protons from the anode to the cathode, and otherwise to maintain the membranes electrically conductive, a humidifier is usually required to humidify the fuel or oxidant gas before it comes into the fuel cell stack. In addition, most conventional fuel cell systems utilize several heat exchangers in gas and coolant delivery subsystems to dissipate the heat generated in the fuel cell reaction, provide coolant to the fuel cell stack, and heat or cool the process gases. In some applications, the process gases or coolant may need to be pressurized before entering the fuel cell stack, and therefore, compressors and pumps may be added to the delivery subsystems.

These peripheral devices require extensive piping and associated hardware, all of which leads to poor system efficiency. This results from significant energy losses occurring in lines or conduits as more power must be made available for supplementary devices such as pumps, fans, saturators etc, and hence the parasitic load is increased. In addition, hoses, pipes, valves, switches and other fittings increase the overall weight and size of the fuel cell system and complicate the commercial application thereof. This complexity poses problems in many applications, such as vehicular applications, where it is desirable that the piping and weight of the fuel cell system be minimized since strict size constraints exist. Furthermore, in vehicular applications, it is desirable for the fuel cell system to have good transient thermo-fluid response characteristics. This requirement makes it even more difficult to apply conventional fuel cell systems to vehicular applications, where relatively long pathways through hoses, valves, etc., can prevent rapid transient response characteristics being obtained.

Various efforts have been made to simplify the piping of fuel cell systems and hence reduce the size and weight thereof. However, to the applicants' knowledge, there has yet to be disclosed any fuel cell system that solves this fundamental problem.

SUMMARY OF THE INVENTION

In accordance with a first aspect of the present invention, there is provided a manifold for a fuel cell system, comprising: a manifold body; a plurality of first ports in the manifold body, for connecting to fuel cell peripherals; a plurality of second ports in the manifold body, for connecting to a fuel cell; and a plurality of first fluid passages within the manifold providing communication between respective ones of the first ports and respective ones of the second ports, whereby, in use, the fluid passages communicate fluids between the fuel cell stack and fuel cell peripherals.

Preferably, the manifold body comprises a single plate with the first ports and second ports are provided such that when the fuel cell and fuel cell peripherals are mounted onto the manifold, the first and second ports are adjacent inlets and outlets of fuel cell and fuel cell peripherals.

More preferably, at least one of the anode inlet port and cathode inlet port has a water separation chamber formed within the manifold body so that water in at least one of the reactant streams of the fuel cell is collected in the water separation chamber.

More preferably, the manifold body further comprises a plurality of third ports and a plurality of second fluid passages within the manifold body in communication with the third ports and first fluid passages, and wherein said third ports and second fluid passages are adapted to accommodate monitoring devices to monitor fluid condition.

According to another aspect of the invention, there is provided a fuel cell system comprising a fuel cell, including: at least one fuel cell having a cathode inlet and a cathode outlet for an oxide, an anode inlet and an anode outlet for a fuel, and a coolant inlet and a coolant outlet; a manifold having ports connected to the cathode inlet, the cathode outlet, the anode inlet, the anode outlet, the coolant inlet, and the coolant outlet of the fuel cell stack; a plurality of additional ports including at least a port for an oxidant inlet, a port for a fuel inlet, and inlet and outlet ports for the coolant; and a plurality of peripheral devices connected to the additional ports of the manifold.

Preferably, the peripheral devices include first enthalpy shifting device, wherein the oxidant inlet is connected by the manifold through the first enthalpy shifting device to the cathode inlet of the fuel cell.

More preferably, the peripheral devices further include a second enthalpy shifting device, and wherein the fuel inlet is connected by the manifold through the second enthalpy shifting device to the anode inlet of the fuel cell, and wherein the manifold includes a fuel outlet port and a connection between the anode outlet and the fuel outlet port.

More preferably, the manifold provides a recirculation passage between the cathode outlet of the fuel cell and one of the first and second enthalpy shifting devices.

More preferably, the fuel cell comprises at least one fuel cell stack disposed between an end plate and the manifold.

The manifold according to the present invention provides an interface between the fuel cell stack and heat exchangers, pump, fans, compressors, reformers, humidifiers etc, as well as process gases and coolant delivery components. This configuration can provide a higher degree of system integration, and hence offers a number of advantages. First, flow channels embossed into the manifold eliminate the need for bulky hoses and fittings and therefore the size and weight of the fuel cell system is considerably reduced. Moreover, thermodynamic and fluid flow related losses in the system are reduced, thus improving system efficiency, response to transient conditions and system control. In addition, since piping is minimized, control and maintenance of the system is simplified. Utilizing the invention minimizes all of the aforementioned difficulties because the compact nature of the manifold allows fuel cell systems to be developed for applications where strict size and weight constraints exist.

Fuel cell systems incorporating the present invention are inherently modular, and thus can be easily reproduced in large quantities at dedicated production facilities. Furthermore, the manifold of the present invention can be manufactured using currently available, inexpensive materials, which makes it suitable for manufacturing and mass production.

BRIEF DESCRIPTION OF THE DRAWINGS

For a better understanding of the present invention, and to show more clearly how it may be carried into effect, reference will now be made to the accompanying drawings, which show, by way of example, preferred embodiments of the present invention. The features and advantages of the present invention will become more apparent in light of the following detailed description of preferred embodiments thereof.

FIG. 1 is a perspective view illustrating a manifold for a fuel cell system according to the present invention;

FIG. 2 is a perspective view from another angle illustrating the manifold for a fuel cell system according to the present invention;

FIG. 7 is a sectional view of the manifold for a fuel cell system according to the present invention, taken along line A—A in FIG. 6;

FIG. 8 is a sectional view of the manifold for a fuel cell system according to the present invention, taken along line B—B in FIG. 6;

FIG. 9 is a sectional view of the manifold for a fuel cell system according to the present invention, taken along line C—C in FIG. 6;

FIG. 10 is a sectional view of the manifold for a fuel cell system according to the present invention, taken along line D—D in FIG. 6;

FIG. 11 is a sectional view of the manifold for a fuel cell system according to the present invention, taken along line E—E in FIG. 6;

FIG. 12 is a sectional view of the manifold for a fuel cell system according to the present invention, taken along line F—F in FIG. 6.

DETAILED DESCRIPTION OF THE INVENTION

Now referring to FIGS. 1 and 2, in which a manifold 10 according to the present invention is shown, the manifold 10 generally comprises one single plate having a plurality of ports and fluid passages provided on the side faces and internally.

Figure 3:
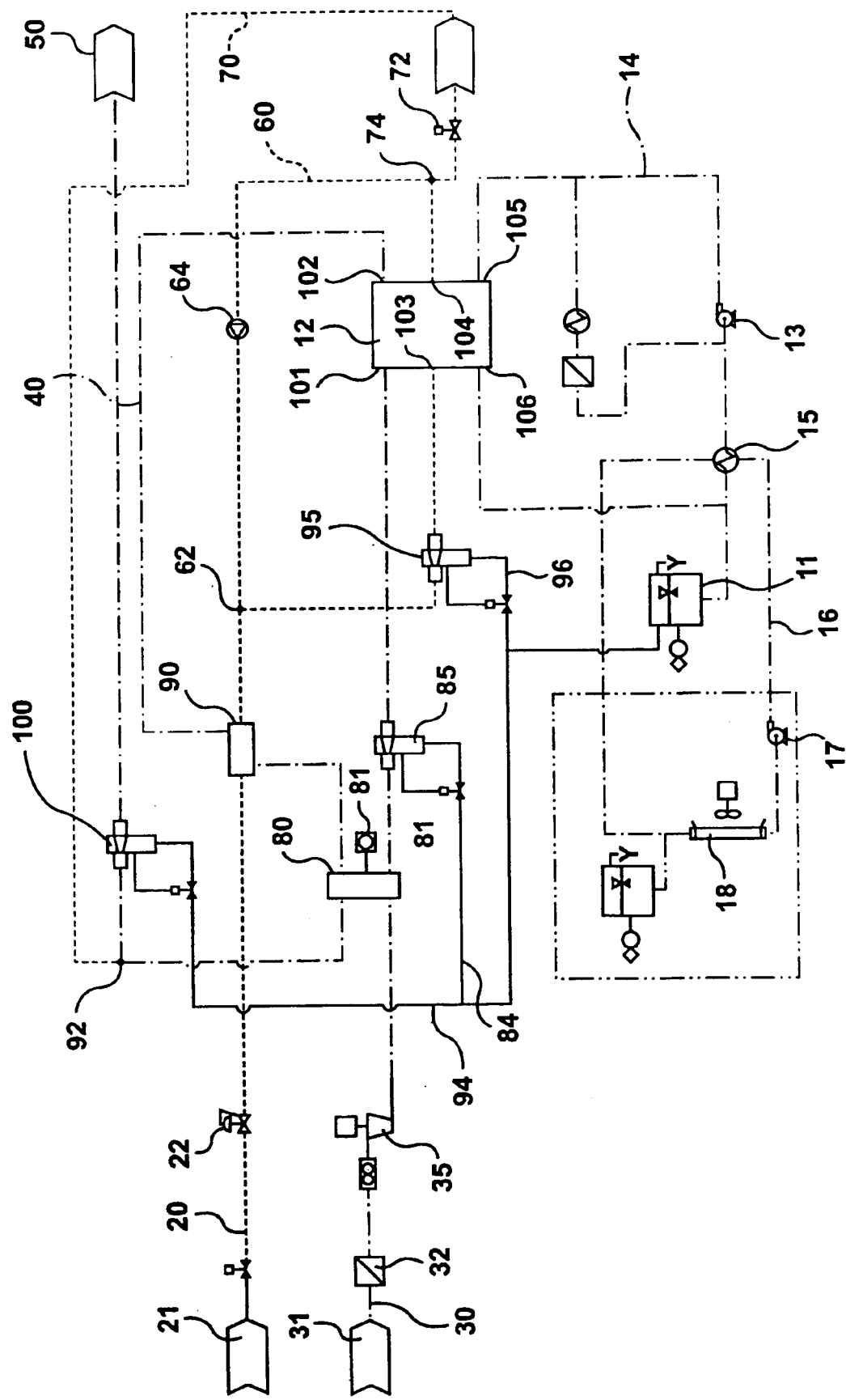
FIG. 3 is a schematic process flow diagram illustrating an application of the manifold for a fuel cell system according to the present invention.

FIG. 3 shows a process flow diagram illustrating the application of the manifold 10 of the present invention in a fuel cell system comprising a fuel cell stack 12. The fuel cell stack 12 typically has three inlets and three outlets, specifically, an anode inlet 103 for fuel gas, typically hydrogen, an anode outlet 104 for the fuel gas, a cathode inlet 101 for oxidant gas, typically oxygen or air, a cathode outlet 102 for oxidant gas, a coolant inlet 105 and a coolant outlet 106. It should be appreciated that the fuel cells in the fuel cell stack can be any type of fuel cell, such as, proton exchange membrane fuel cells, solid oxide fuel cells, direct methanol fuel cells, etc. The type of the fuel cells will not affect the design of the manifold according to the present invention.

In FIG. 3, a fuel supply line 20, an oxidant supply line 30, a cathode exhaust recirculation line 40 and an anode exhaust recirculation line 60 are all connected to a fuel cell 12. A fuel supply line 20 is connected to a fuel source 21 for supplying hydrogen to the anode of the fuel cell 12, and includes a flow regulating device 22. A hydrogen humidifier 90 is disposed in the fuel supply line 20 upstream from the fuel cell 12 and an anode water separator 95 is disposed between the hydrogen humidifier 90 and the fuel cell 12. An oxidant supply line 30 is connected to an oxidant source 31 for supplying air to the cathode of the fuel cell 12. An enthalpy wheel 80 is disposed in the oxidant supply line 30 upstream of the fuel cell 12 and also in a cathode recirculation line 40. A cathode water separator 85 is disposed between the enthalpy wheel 80 and the fuel cell 12. In known manner, a motor 81 drives the enthalpy wheel 80. Dry ambient air enters the oxidant supply line 30 and first passes through an air filter 32 that filters out the impurity particles. A blower 35 is disposed upstream of the enthalpy wheel 80, to draw air from the air filter 32 and to pass the air through a first region of the enthalpy wheel 80.

The cathode exhaust stream is recirculated through the cathode exhaust recirculation line 40 connected to the cathode outlet of the fuel cell 12. The humid cathode exhaust stream first passes through the hydrogen humidifier 90 in which the heat and humidity is transferred to incoming dry hydrogen in the fuel supply line 20. From the hydrogen humidifier 90, the fuel cell cathode exhaust stream continues to flow along the recirculation line 40 and passes through a second region of the enthalpy wheel 80, as mentioned above. The cathode exhaust stream continues to flow along the recirculation line 40 to an exhaust water separator 100 in which the excess water, again in liquid form, that has not been transferred to the incoming hydrogen and air streams is separated from the exhaust stream. Then the exhaust stream is discharged to the environment along a discharge line 50.

Fuel cell anode exhaust comprising excess hydrogen and water is recirculated by a pump 64 along the anode recirculation line 60 connected to the anode outlet of the fuel cell 12. The anode recirculation line 60 connects to the fuel supply line 20 at a joint 62 upstream from the anode water separator 95.

A hydrogen purge line 70 branches out from the fuel recirculation line 60 from a position 74 adjacent the fuel cell cathode outlet. A purge control device 72 is disposed in the hydrogen purge line 70 to purge a portion of the anode exhaust out of the recirculation line 60. The hydrogen purge line 70 runs from the position 74 to a joint point 92 at which it joins the cathode exhaust recirculation line 40. There, the mixture of purged hydrogen and the cathode exhaust from the enthalpy wheel 80 passes through the exhaust water separator 100. Water is condensed in the water separator 100 and the remaining gas mixture is discharged to the environment along the discharge line 50.

Water is recovered along line 96, line 84 and line 94 to a product water tank 11.

A coolant loop 14 runs through the fuel cell 12. A pump 13 is disposed in the cooling loop 14 for circulating a coolant. A heat exchanger 15 is provided in the cooling loop 14 for cooling the coolant flowing through the fuel cell 12. A secondary loop 16 includes a pump 17, to circulate a secondary coolant. A heat exchanger 18, e.g. a radiator, is provided to maintain the temperature of the coolant in the secondary loop.

Figure 4:
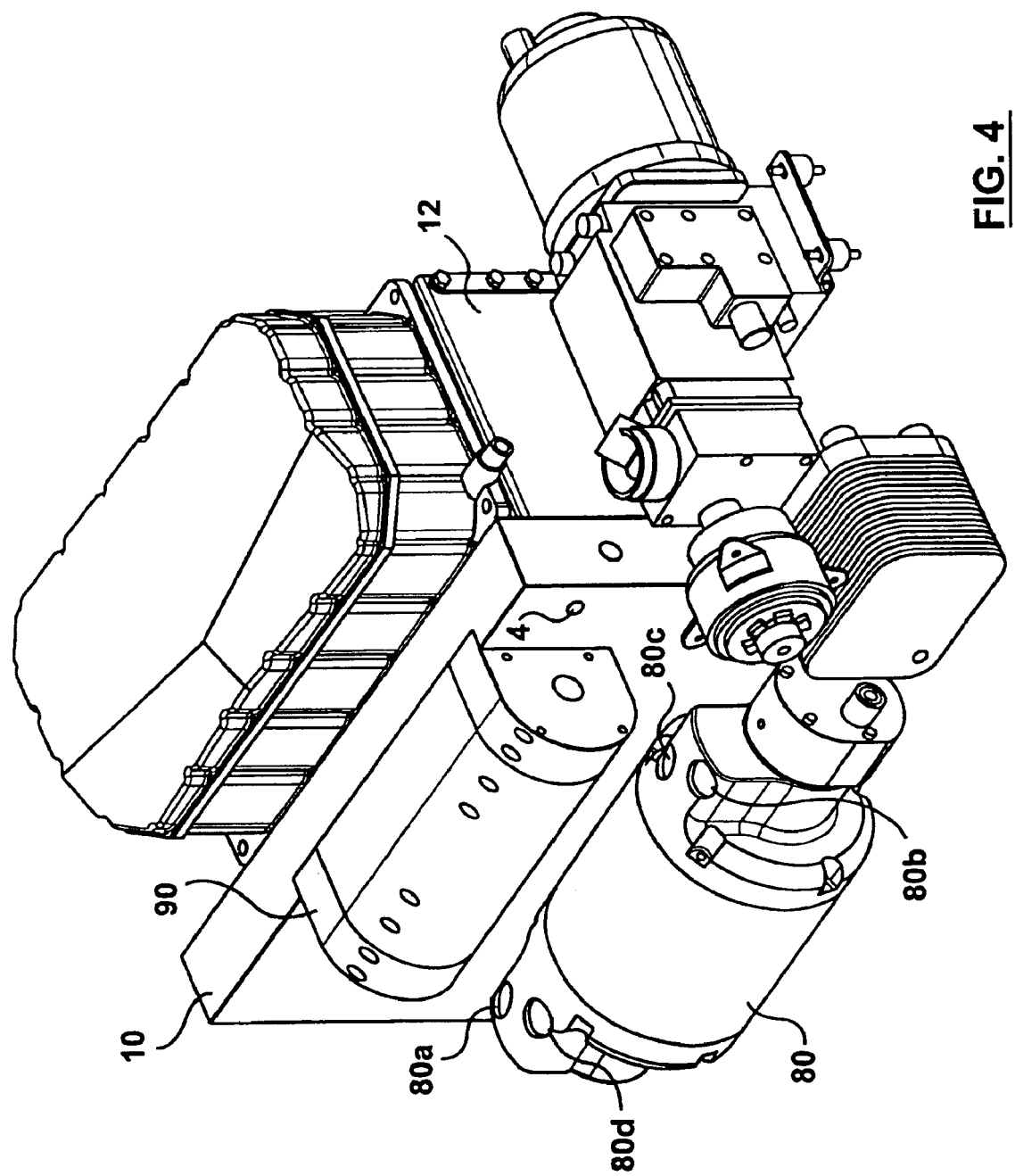
FIG. 4 is a perspective view illustrating the manifold for a fuel cell system in a fuel cell power unit.

Now the process flow of the fuel cell system will be described in detail with reference being made to FIGS. 3 to 5. Fuel, such as hydrogen, supplied from a fuel source, passes through an anode humidifier 90 (an enthalpy shifting device) upstream of the anode inlet 103 for heating and humidifying the anode inlet stream of the fuel cell stack 12. Then the humidified anode inlet stream flow through an anode inlet water separator 95 in which excess liquid water in the anode inlet stream is separated. Then, the anode inlet stream flows into the fuel cell stack 12 through the anode inlet 103. In known manner, a number of monitoring devices are provided immediately upstream of the anode inlet 103, such temperature sensor and pressure transmitter, etc, for monitoring the condition of the anode inlet stream.

Figure 5:
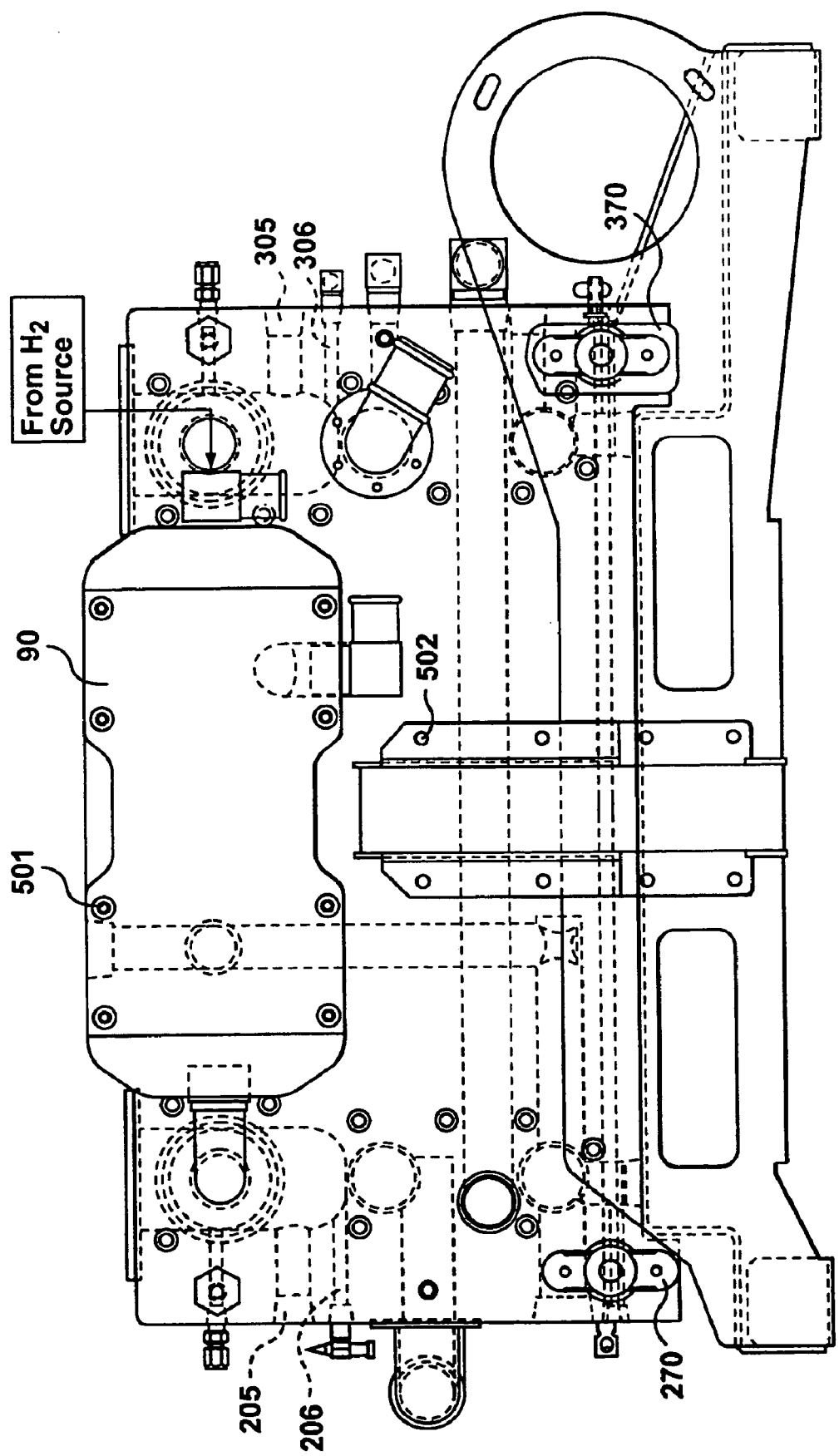
FIG. 5 is a front elevation view of the manifold for a fuel cell system according to the present invention, in which devices assembled onto the manifold are shown.
Figure 6:
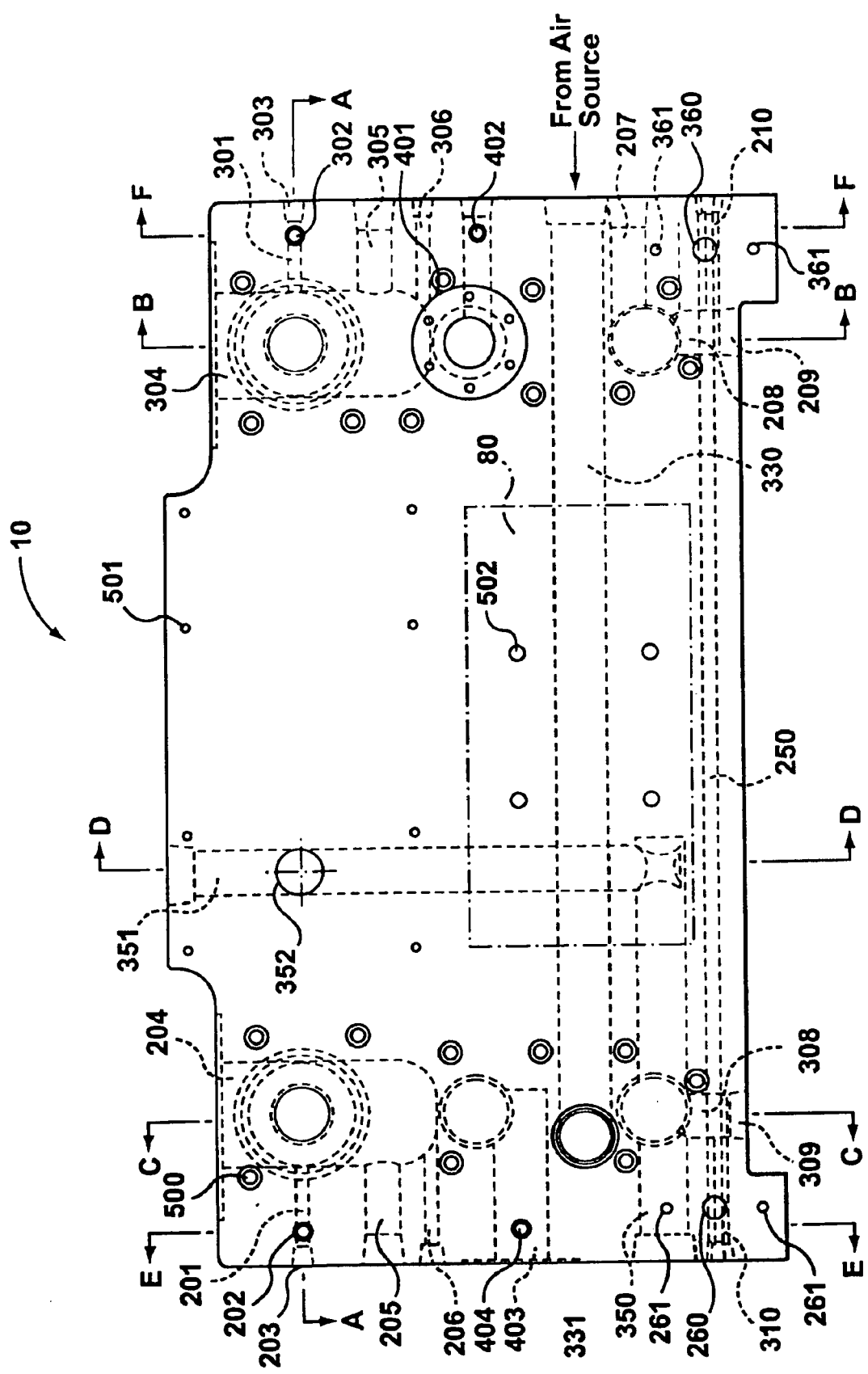
FIG. 6 is front elevation view of the manifold for a fuel cell system according to the present invention.

In FIGS. 5 and 6, hydrogen passes through the anode humidifier 90 and flows along a conduit (not shown) that connects the one outlet of humidifier 90 mounted on one side of the manifold 10 to the anode inlet port 1 on the manifold plate. Port 1 is a through hole through the thickness of the manifold 10, as shown FIG. 7, and in communication with anode inlet 103 of the fuel cell stack on the opposite side of the manifold plate 10. It is positioned corresponding to the anode inlet 103 of the fuel cell stack 12. As shown in FIGS. 6, 7, 9 and 11, an internal passage 201 fluidly connects the anode inlet port 1 and left side (as in FIG. 6) of the manifold 10 and a through hole 202 is provided in fluid communication with passage 201 and extending substantially perpendicular to the plane of FIG. 6. Monitoring devices can be placed in the through hole 202 from both sides (front and rear in FIG. 6) of the manifold 10 to measure parameters of the anode inlet fluid immediately upstream of the anode inlet 103, providing accurate information of the anode inlet stream. A plug 203 can be provided to close the internal passage 201 in operation, if this is not otherwise required. It is also known that plugs can be provided to close one or both ends of the through hole 202 if necessary, for example, when only one pressure transmitter is inserted from one side of the manifold.

A water separation chamber 204 is provided internally within the manifold 10 in communication with the anode inlet port 1. The water separation chamber 204 serves the function of the anode outlet water separator 95 in FIG. 3, and comprises a chamber extending vertically down from anode inlet port 1. The separation chamber 204 also has a relatively large flow cross-section, as compared to the anode inlet 1, to promote lower velocities and separation of water from the fuel gas. As noted below, it is usually preferred to insert a water separation device in the chamber 204. An internal drain passage 206 is provided on the left side (FIG. 6) of the manifold 10 and in communication with the bottom portion of the water separation chamber 204 to discharge separated water out of the manifold 10. An internal passage 205 is provided above the drain passage 206 and a water level switch can be placed into the passage 205 to monitor the level of the separated water so that the water can be discharged, e.g. by pumping if required, on a regular basis. It is to be understood that a water separation device can be disposed in the water separation chamber 204 to enhance separation of liquid water from the anode inlet stream. The water separation device can be any commonly used device customized to fit into the chamber 204.

Fuel (hydrogen) stream flows through the fuel cell stack 12 and leaves the fuel cell stack 12 through the anode outlet 104. The manifold 10 has an anode outlet port 6 positioned corresponding to the anode outlet 104 of the fuel cell stack 12. The anode outlet port 6 is not a through hole through the thickness of the manifold 10 as is the anode inlet port 1. The outlet port 6 is a blind hole starting from the rear side (FIGS. 6 and 8) of the manifold 10. The fuel exhaust passes into the anode outlet port 6 and leaves the manifold 10 via an internal passage 207 that communicates the anode outlet port 6 with right side (FIG. 6) of the manifold 10. A monitoring device can be placed in a passage 211 (FIG. 12) that extends from the rear side of the manifold 10 and communicates with the passage 207, to monitor the condition of fuel exhaust stream. As shown in FIGS. 6 and 8, an internal water drain passage 208 extending from the bottom face of the manifold 10 is in communication with the anode outlet port 6 and another internal water drain passage 210 communicates the drain passage 208 with the right side of the manifold 10. Liquid water from the anode exhaust stream can be directed out of the manifold 10 via the two drain passages 208 and 210. It will be appreciated that a plug 209 is used to close the drain line 208 on the bottom face of the manifold 10.

As shown in FIG. 3, a portion of the fuel exhaust is recycled to the anode inlet 103 of the fuel cell stack 12. This can be done by a conduit (not shown) that communicates the passage 207 with the anode inlet port 1 outside of the manifold 10. Since the manifold 10 is compact, the length of this recycling conduit is short and loss of heat and humidity in the fuel exhaust is thus considerably reduced.

As shown in FIG. 3, oxidant, such as air, is supplied from ambient by, for example, an air blower 35 or compressor, to pass through an enthalpy shifting device, e.g. an enthalpy wheel 80 for heating and humidifying the cathode inlet stream. Then the cathode inlet stream passes through a cathode inlet water separator 85 immediately upstream of the cathode inlet 101 of the fuel cells stack 12. In FIG. 6, the air is supplied to an internal passage 330 that extends substantially horizontally from the right side (FIG. 6) of the manifold 10 to a position inside the manifold 10 adjacent an inlet of cathode inlet stream in the enthalpy wheel 80. A blind hole 331 extending from the front side of the manifold 10 communicates the internal passage 330 with the front face of the manifold 10 and a conduit (not shown) connects the blind hole 331 with the inlet of the enthalpy wheel 80. Then air flows along the passage 330, the blind hole 331 and the conduit to an inlet 80*a* of the enthalpy wheel 80 and flows through the enthalpy wheel 80 from the left to the right side. Then, the air stream flows along a conduit (not shown) that connects an outlet 80*b* of the enthalpy wheel 80 to a cathode inlet port 4 of the manifold 10. The cathode inlet port 4 is a through hole through the thickness of the manifold 10 and positioned corresponding to the anode inlet 101 of the fuel cell stack 12.

It will be appreciated that it is preferably to provide ports on manifold 10 adjacent the inlets and outlets of the enthalpy wheel 80 and anode humidifier 90 and other fuel cell peripherals so that the length of the conduits used to connect the ports of the manifold 10 and the fuel cell peripherals is minimized to reduce heat and pressure loss in conduits. Since manifold 10 can be manufactured using materials having good heat insulation property, the heat loss within the manifold 10 can be much lower than that in conduits outside of the manifold 10.

As shown in FIGS. 6, 7, 8 and 12, an internal passage 301 fluidly connects the anode inlet port 4 to the right side (as in FIG. 6) of the manifold 10 and a through hole 302 is provided in fluid communication with passage 301 and extending substantially perpendicularly to the plane of FIG. 6. Monitoring devices can be placed in the through hole 302 from one or both sides (front and rear in FIG. 6) of the manifold 10 to measure parameters of the cathode inlet fluid immediately upstream of the cathode inlet 101, providing accurate information of the cathode inlet stream. A plug 303 can be provided to close the internal passage 301 in operation. It is also known that plugs can be provided to close one or both ends of the through hole 302 if necessary, for example, when only one pressure transmitter is inserted from one side of the manifold. Corresponding to the water separation chamber 204, a water separation chamber 304 is provided internally of the manifold 10 in communication with the cathode inlet port 6. The water separation chamber 304 serves the function of the cathode inlet water separator 85 in FIG. 3. An internal drain passage 306 is provided on the right side (FIG. 6) of the manifold 10 and in communication with the bottom portion of the water separation chamber 304 to discharge separated water out of the manifold 10. An internal passage 305 is provided above the drain passage 306 and a water level switch can be placed into the passage 305 to monitor the level of the separated water so that the water can be discharged, e.g. by pumping if required, on a regular basis. It is to be understood that a water separation device can be disposed in the water separation chamber 304 to enhance separation of liquid water from the cathode inlet stream as for the chamber 204. The water separation device can be any commonly used device customized to fit into the chamber 304.

As shown in FIG. 3, an oxidant (air) stream flows through the fuel cell stack 12 and leaves the fuel cell stack 12 through the cathode outlet 102. The cathode exhaust stream is recirculated from the cathode outlet 102 of the fuel cells stack 12 to the anode humidifier 90 and then to the enthalpy wheel 80. The humidity and heat in the cathode exhaust stream is transferred to the incoming fuel stream in the anode humidifier 90 and the incoming oxidant stream in the enthalpy wheel 80, respectively. Then the cathode exhaust is discharged to the environment.

The manifold 10 has a cathode outlet port 3 positioned corresponding to the cathode outlet 102 of the fuel cell stack 12. The cathode outlet port 3 is not a through hole through the thickness of the manifold 10 as is cathode inlet port 4. It is a blind hole extending from the rear side (FIG. 6) of the manifold 10. The oxidant exhaust passes through the cathode outlet port 3 and flows along an internal flow passage 350 extending substantially horizontally from left side of the manifold 10 to a position inside of the manifold 10 from where another internal passage 351 starts to extend upwardly to the top surface of the manifold 10. A blind hole 352, extending from the front face of the manifold 10 and extending substantially perpendicular to the plane of FIG. 6, intercepts and communicates with the passage 350. The blind hole 352 is position such that it is adjacent to the inlet for cathode exhaust on the anode humidifier 90. A conduit (not shown) connects the blind hole 352 to the said inlet. Therefore, cathode exhaust stream flows from cathode outlet port 3, along passages 350 and 351, the blind hole 352 and the conduit (not shown) into the anode humidifier 90. Then the cathode exhaust flows through the anode humidifier 90 to the enthalpy wheel 80 via a conduit (not shown) connecting an outlet of the anode humidifier 90 to an inlet 80*c* of the enthalpy wheel 80. The cathode exhaust stream is discharged after it passes through the enthalpy wheel 80 through an outlet 80*d*. As shown in FIG. 6, an internal water drain passage 308 extending from the bottom face of the manifold 10 and is in communication with the cathode outlet port 3 and another internal water drain passage 310 communicates the drain passage 308 with the left side of the manifold 10. Liquid water from the cathode exhaust stream can be directed out of the manifold 10 via the two drain passages 308 and 310 immediately after it comes out of the fuel cell stack 12. It will be appreciated that a plug 309 is used to close the drain line 308 on the bottom face of the manifold 10. It will also be understood that monitoring devices, such as a pressure transmitter, a temperature sensor can be placed in a passage 353 in communication with the passage 350 to monitor the condition of cathode exhaust stream. The passage 353 extends from the rear side (shown in FIG. 11) of the manifold 10, i.e. the side on which the fuel cell stack 12 is mounted as can be best seen in FIG. 11.

As shown in FIG. 3, a cooling loop 14 is provided for the fuel cell stack 12 in which coolant is continuously circulated to pass through the fuel cell stack 12, and hence to absorb the heat generated in fuel cell reaction. In FIG. 6, a coolant inlet port 5 and a coolant outlet port 2 are provided corresponding to the coolant inlet 105 and coolant outlet 106 of the fuel cell stack 12, respectively. Coolant inlet port 5 is a through hole extending through the entire thickness of the manifold 10 while coolant outlet port 2 is a blind hole extending from the rear side (FIG. 6) of the manifold 10. Coolant is supplied to the coolant inlet port 5 on the front face of the manifold 10 and flows through the coolant inlet port 5 into the coolant inlet 105. An internal passage 401 fluidly connects the coolant inlet port 5 with right side of the manifold 10. Monitoring devices can be placed in a through hole 402, connected to the passage 401, to monitor the condition of the coolant adjacent the coolant inlet 105. The through hole 402 extends through the thickness of the manifold 10. In case a compressor is used, coolant may be directed to cool the compressed air immediately after the air exits from the compressor to prevent the overheating of enthalpy wheel 80. Therefore, a portion of the coolant is directed along the passage 401 to a heat exchanger for cooling the incoming air. When such cooling is not necessary, such as when incoming air is under ambient pressure, the passage 401 can simply be closed by a plug.

The coolant flows through the fuel cell stack 12 and leaves the fuel cell stack 12 through the coolant outlet 106. Then the coolant continues to flow to the coolant outlet port 2 and leaves the manifold 10 via an internal passage 403 that fluidly connects the left side (FIG. 6) of the manifold to the coolant outlet 2. Then coolant returns to the coolant storage tank 11 as shown in FIG. 3 via, for example a conduit (not shown). A through hole 404 is provided to intercept the passage 403 and monitoring devices can be placed in the through hole 404 to monitor the condition of the coolant adjacent the coolant outlet 106.

Preferably, as shown in FIG. 6, an internal water drain passage 250 is provided extending substantially horizontally. Water separated from the drain passages 206 and 306 is directed to the passage 250. Specifically, the drain passage extends from left side to right side of the manifold 10 and two blind holes 260 and 360 extending from the front face intercept the drain passage 250. A pair of mounting holes 261 are provided adjacent the blind hole 260 and similarly a pair of mounting holes 361 are provided adjacent the blind hole 360 for respectively mounting on the front face of the manifold 10 a connector 270 (FIG. 5) fluidly communicating with the blind hole 260 and a connector 370 (FIG. 5) fluidly communicating with the blind hole 360. Water separated from drain passage 206 is directed via a conduit (not shown) to the connector and to the drain passage 250 through the blind hole 260. Likewise, water separated from drain passage 306 is directed via a conduit (not shown) to the other connector and to the drain passage 250 through the blind hole 360. Then the collected water in drain passage 250 can be directed out of the manifold from either end of the drain passage 250. It will be appreciated that the other end is closed by, for example, a plug.

As can be appreciated from the above description, the fuel cell stack 12 is mounted on the rear side (FIG. 6) of the manifold 10, i.e. below the plane of FIG. 6. The manifold 10 has a plurality of through holes 500 so that securing means, such as bolts can be accommodated in the through holes 500 to secure the fuel cell stack 12 onto the manifold plate 10. It will also be appreciated from FIG. 6 that mounting holes 501 are provided for mounting the anode humidifier 90 and mounting holes 502 are provided for mounting the enthalpy wheel 80. Generally, the fuel cell stack 12 has two end plates and clamping means to hold together the stack of individual fuel cells within the fuel cell stack 12. End plates of the fuel cell stack 12 have various ports for fuel, oxidant and coolant. In the present invention, the fuel cell stack may also have such end plates and when assembled with the manifold plate, one end plate abuts against one side (rear side in FIG. 6) of the manifold 10. However, it is apparent from the above description that the manifold 10 of the present invention can simply be used as an end plate of the fuel cell stack 12. In this case, the size of the overall system is further reduced, and seals can be eliminated.

It is to be understood that although not deliberately described, conventional sealing and clamping devices, such as O-rings are utilized around each connection of conduits, ports and passages. It will be appreciated that the plurality of ports and fluid passages described can be formed by etching or milling while the ports can be formed by boring or drilling. The manifold in the present invention can be manufactured with readily available, cheap materials with adequate heat durability or fluid resistance, including but not limited to polymers, Nylon, etc. Preferably, the material should have light weight. Also, the manifold could be formed by molding, which for at least some of the ducts would eliminate the need for holes or passages closed at one end by a plug.

It is also possible that other fuel cell peripherals, such as the enthalpy wheel, DC/AC converter, etc can be coupled to the manifold 10. The arrangement of ports and fluid passages may be varied in accordance with the particular process. The manifold 10 can also be manufactured in L shape, arc shape, triangle shape, etc. Additionally, one or more peripheral components can be mounted to the same face of the manifold or the fuel cell stack. While the invention has been described with one manifold mounted to one fuel cell stack, other combinations are possible. For example, one manifold could be provided for a number of stack assemblies, to enable sharing of peripheral components. On the other hand, one (or more than one) fuel cell stacks could have two or more manifolds; for example, a common stack configuration provides connection ports on both ends, and it may be advantageous to provide a manifold at each end, which manifolds may have different configurations.

It is to be noted that various fluid passages within the manifold 10 can be provided either internal of the manifold or on the surface thereof in the form of open channels, depending on the configuration of the fuel cell system.

It should be appreciated that the spirit of the present invention is concerned with a novel structure of the manifold for fuel cell systems and its use as an interface between the fuel cell stack and the peripherals. The type and internal structure of the fuel cell stack does not affect the design of the present invention. In other words, the present invention is applicable to various types of fuel cells, electrolyzers or other electrochemical cells. The position, number, size and pattern of those ports provided on the manifold assembly are not necessarily identical as disclosed herein.

It is anticipated that those having ordinary skill in this art can make various modification to the embodiment disclosed herein after learning the teaching of the present invention. For example, the shape of the manifold assembly, the number or arrangement of ports might be different, the materials for making the manifold assembly might be different and the manifold assembly might be manufactured using different methods as disclosed herein. However, these modifications should be considered to fall under the protection scope of the invention as defined in the following claims.

What is claimed is:

1. A manifold for a fuel cell system, comprising:
   a manifold body
   a plurality of first ports in the manifold body, for connecting to fuel cell peripherals;

a plurality of second ports in the manifold body, for connecting to a fuel cell;

a plurality of first fluid passages within the manifold providing communication between respective ones of the first ports and respective ones of the second ports, whereby, in use, the fluid passages communicate fluids between the fuel cell stack and fuel cell peripherals; and a plurality of third ports and a plurality of second fluid passages within the manifold body in communication with the third ports and first fluid passages, and wherein said third ports and second fluid passages are adapted to accommodate monitoring devices to monitor fluid condition.

2. A manifold for a fuel cell system as claimed in claim 1, wherein the manifold body comprises a single plate.

3. A manifold for a fuel cell system as claimed in claim 2, wherein the first ports and second ports are provided such that when the fuel cell and fuel cell peripherals are mounted onto the manifold, the first and second ports are adjacent inlets and outlets of fuel cell and fuel cell peripherals.

4. A manifold for a fuel cell system as claimed in claim 3, wherein the manifold body comprises an anode inlet port, an anode outlet port, a cathode inlet port, a cathode outlet port, a coolant inlet port and a coolant outlet port, and wherein each of said ports is positioned corresponding to an anode inlet, an anode outlet, a cathode inlet, a cathode outlet, a coolant inlet and a coolant outlet of the fuel cell.

5. A manifold for a fuel cell system as claimed in claim 4, wherein at least one of the anode inlet port and the cathode inlet port has a water separation chamber formed within the manifold body so that water in at least one of the reactant streams of the fuel cell is collected in the water separation chamber.

6. A manifold for a fuel cell system as claimed in claim 5, wherein the manifold body further comprises a water drain passage formed within the manifold body providing communication between said water separation chamber and the exterior of the manifold body for directing water collected in the water separation chamber out of the manifold body.

7. A manifold for a fuel cell system as claimed in claim 6, wherein at least one of the anode outlet port and cathode outlet port has a water drain passage formed within the manifold body for collecting water in the reactant stream passing through the corresponding outlet port, and for directing the water out of the manifold body.

8. A manifold for a fuel cell system as claimed in claim 7, wherein the manifold further comprises a coolant passage formed within the manifold body and in communication with the coolant outlet port for directing coolant out of the manifold body.

9. A manifold as claimed in claim 8, wherein the manifold further comprises a plurality of mounting holes for mounting the fuel cell and fuel cell peripherals.

10. A manifold for a fuel cell system as claimed in claim 9, wherein sealing means are provided around the first, second and third ports.

11. A manifold for a fuel cell system, comprising:

a manifold body a plurality of first ports in the manifold body, for connecting to fuel cell peripherals;

a plurality of second ports in the manifold body, for connecting to a fuel cell;

a plurality of first fluid passages within the manifold providing communication between respective ones of the first ports and respective ones of the second ports, whereby, in use, the fluid passages communicate fluids between the fuel cell stack and fuel cell peripherals;

wherein the manifold is integrally formed by one of casting and molding.

12. A manifold for a fuel cell system as claimed in claim 11, wherein the manifold body is formed from a polymer.

13. A manifold for a fuel cell system as claimed claim 12, wherein the fluid passages are formed using a method selected from the group comprising melting, etching and milling.

14. A fuel cell system comprising a fuel cell, including:

at least one fuel cell having a cathode inlet and a cathode outlet for an oxide, an anode inlet and an anode outlet for a fuel, and a coolant inlet and a coolant outlet;

a manifold having first ports connected to the cathode inlet, the cathode outlet, the anode inlet, the anode outlet, the coolant inlet, and the coolant outlet of the fuel cell stack, a plurality of additional ports including at least an additional port for an oxidant inlet, an additional port for a fuel inlet, and coolant inlet and coolant outlet additional ports; and a plurality of peripheral devices connected to the additional ports of the manifold, including a first enthalpy shifting device, wherein the oxidant inlet is connected by the manifold through the first enthalpy shifting device to the cathode inlet of the fuel cell.

15. A fuel cell system as claimed in claim 14, wherein the manifold includes a first water separation chamber, and wherein manifold provides for oxidant to flow through the first enthalpy shifting device and the water separation chamber to the cathode inlet.

16. A fuel cell system as claimed in claim 15, wherein the peripheral devices further include a second enthalpy shifting device, and wherein the fuel inlet is connected by the manifold through the second enthalpy shifting device to the anode inlet of the fuel cell, and wherein the manifold includes a fuel outlet port and a connection between the anode outlet and the fuel outlet port.

17. A fuel cell system as claimed in claim 16, wherein the manifold comprises a second water separation chamber, and wherein manifold provides for fuel to flow through the second enthalpy shifting device and the water separation chamber to the anode inlet.

18. A fuel cell system as claimed in claim 17, wherein the manifold provides a recirculation passage between the cathode outlet of the fuel cell and one of the first and second enthalpy shifting devices.

19. A fuel cell system as claimed in any one of the claims 14 and 15 to 17, wherein the fuel cell comprises at least one fuel cell stack disposed between an end plate and the manifold.

* * * * *